United States Patent [19]
Kawamoto et al.

[11] Patent Number: 5,920,063
[45] Date of Patent: Jul. 6, 1999

[54] IMAGE SENSING DEVICE, LINEAR SENSOR FOR USE IN THE IMAGE SENSING DEVICE, AND METHOD OF DRIVING THE LINEAR SENSOR

[75] Inventors: Seiichi Kawamoto; Tadakuni Narabu, both of Kanagawa, Japan

[73] Assignee: Sony Corporation, Tokyo, Japan

[21] Appl. No.: 08/752,377

[22] Filed: Dec. 4, 1996

[30] Foreign Application Priority Data

Dec. 5, 1995 [JP] Japan ............................. P07-316323

[51] Int. Cl.$^6$ .......................... H01J 40/14; H04N 1/191
[52] U.S. Cl. ....................... 250/208.1; 358/483
[58] Field of Search ..................... 250/208.1, 208.2, 250/214 R, 226, 234, 235; 358/513, 514, 482, 483, 494

[56] References Cited

U.S. PATENT DOCUMENTS

| | | | |
|---|---|---|---|
| 4,009,388 | 2/1977 | Seachman | 250/208.1 |
| 4,833,724 | 5/1989 | Goel | 382/65 |
| 4,866,512 | 9/1989 | Hirosawa et al. | 358/514 |
| 5,340,977 | 8/1994 | Kojima et al. | 250/208.1 |
| 5,361,145 | 11/1994 | Hasegawa | 358/514 |

Primary Examiner—Edward P. Westin
Assistant Examiner—John R. Lee
Attorney, Agent, or Firm—Hill & Simpson

[57] ABSTRACT

A linear sensor includes first, second, and third linear sensor sections each composed of a linear array of sensor elements, wherein the linear arrays of sensor elements are spaced seven lines apart from each other. In operation, an image is sensed while moving the linear sensor three lines at a time. The output signals of the respective linear sensor sections are adjusted in terms of the timing relative to each other by a timing adjustment circuit. This allows the linear sensor to sense an image at a higher scanning speed and thus for a shorter time period.

9 Claims, 6 Drawing Sheets

IMAGE SENSING DEVICE, LINEAR SENSOR FOR USE IN THE IMAGE SENSING DEVICE, AND METHOD OF DRIVING THE LINEAR SENSOR

BACKGROUND OF THE INVENTION

1. Field of the Invention

The present invention relates to an image sensing device for use in a digital copying machine or the like, for sensing image information of a document, and also to a linear sensor for use in the image sensing device. The invention also relates to a method of driving the linear sensor.

2. Description of the Related Art

In an image sensing device used in a digital copying machine or the like, a linear sensor is used as means for sensing image information across a document. A typical conventional monochrome linear sensor includes only a single line of sensor elements. The image information is sensed with this single line of sensor elements while scanning a document in the secondary scanning direction perpendicular to the line sensor.

In the conventional linear sensor with the single line of sensor elements, the image information is sensed line by line. Therefore, to read image information composed of n lines, it is required to repeat sensing operation n times in the secondary direction. Such the repetition of sensing operation needs a long time to read the full image information composed of n lines.

SUMMARY OF THE INVENTION

It is an object of the present invention to solve the above problem. More specifically, it is an object of the present invention to provide an image sensing device capable of sensing image information at a higher scanning speed and thus for a shorter time period. It is another object of the present invention to provide a linear sensor capable of sensing image information at a higher scanning speed. It is still another object of the present invention to provide a method of driving the linear sensor.

According to one aspect of the invention, there is provided an image sensing device including: a linear sensor including a plurality of linear arrays of sensor elements, the linear arrays of sensor elements being located at predetermined intervals, the linear sensor being adapted for sensing image information while performing scanning in a secondary scanning direction perpendicular to the linear arrays of sensor elements; and driving means for scanning the linear arrays of sensor elements in the secondary scanning direction so that the plurality of linear arrays of sensor elements sense image information on different lines.

In the image sensing device with the above structure, a plurality of lines of image information are sensed at a time with the linear sensor composed of the plurality of linear arrays of sensor elements. The driving means drives the plurality of linear arrays of sensor elements in the secondary scanning direction in such a manner that the image information is sensed without duplication among different linear arrays of sensor elements.

The invention also provides a linear sensor including N linear arrays of sensor elements (wherein N is an integer equal to or greater than 2) wherein the 2nd and following linear arrays of sensor elements are located at positions apart from the 1st linear array by distances, represented in units of line widths, which yield remainders of 1, 2, . . . , N−1 when divided by N. Furthermore, the invention provides a method of driving the linear sensor in which the linear sensor is moved by a distance corresponding to N lines at a time in the secondary scanning direction.

In the present invention, as described above, N lines of image information can be sensed at a time with the linear sensor provided with N linear arrays of sensor elements. In the image sensing operation, the image sensor, in which the 2nd and the following linear arrays of sensor elements are located at positions apart from the 1st linear array by distances which yield remainders of 1, 2, . . . , N−1 when divided by N, is moved by a distance corresponding to N lines at a time thereby ensuring that the image information is sensed in such a manner that the same line is not sensed in a duplicated fashion by different linear arrays of sensor elements.

DESCRIPTION OF THE PREFERRED EMBODIMENTS

With reference to specific embodiments, the present invention will be described in further detail below in conjunction with the accompanying drawings.

Figure 1:
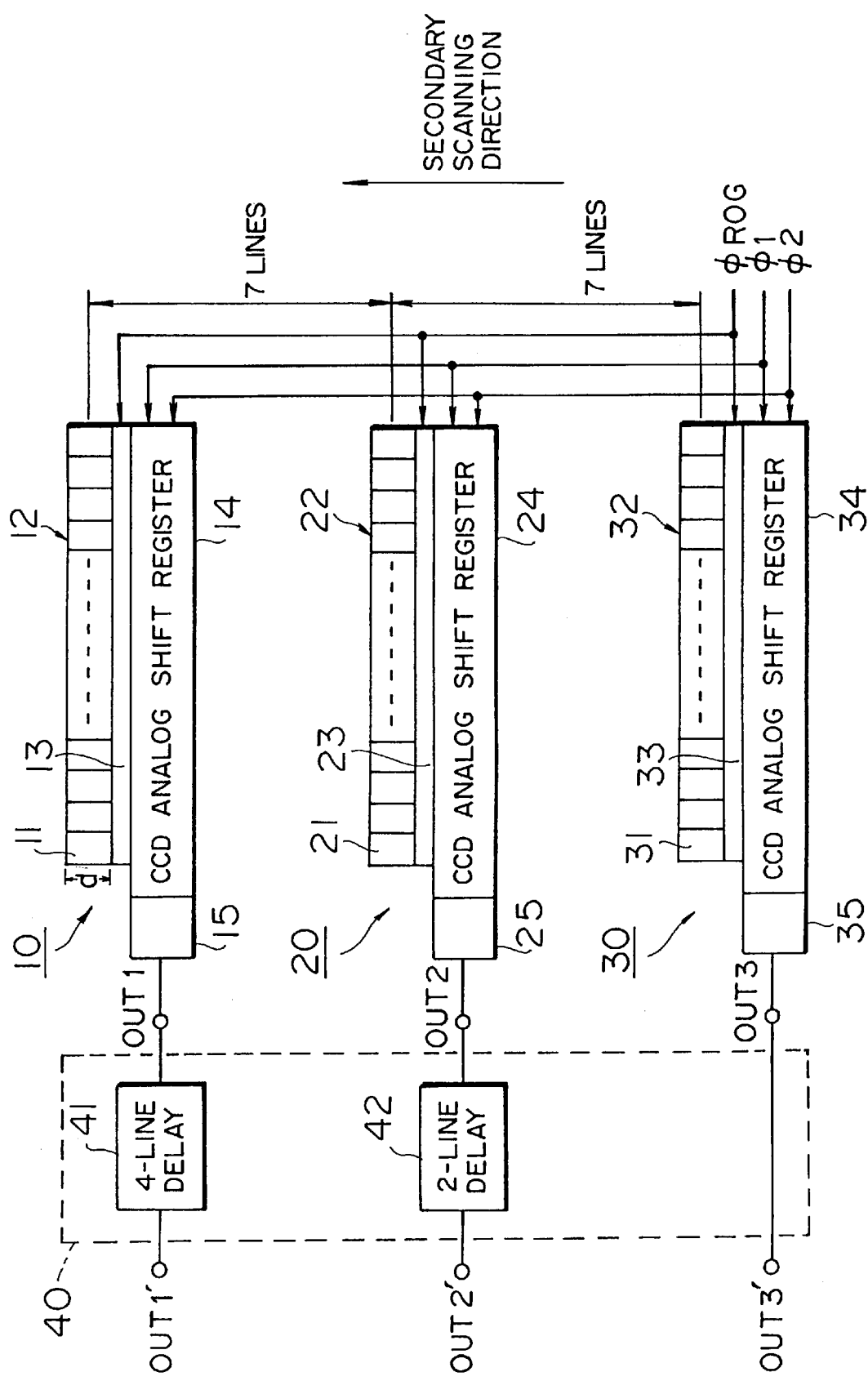
FIG. 1 is a schematic diagram illustrating one embodiment of the present invention.

FIG. 1 is a schematic diagram illustrating one embodiment of the present invention. As shown in FIG. 1, the linear sensor according to this embodiment includes 1st, 2nd, and 3rd linear sensor sections 10, 20, and 30 arranged in the form usually called a three-line structure. The 1st linear sensor section 10 includes a linear sensor array 12 composed of a large number of photoelectric conversion elements (pixels) 11 arranged in a line. At a side of the linear sensor array 12, there are provided readout gates 13 for reading signal charges which have been converted from optical form to electrical form by the respective photoelectric conversion elements 11 and there is also provided a charge transfer register for transferring the above signal charges (hereinafter referred to as an analog CCD shift register) 14.

In the 1st linear sensor section 10, in response to a readout gate pulse $\phi ROG$ applied to the readout gate 13, the signal charges of the respective photoelectric conversion elements 11 in the linear sensor array 12 are transferred to the analog CCD shift register 14 via the readout gate 13. These signal charges are sequentially transferred through the analog CCD shift register 14 in response to two-phase transfer clocks $\phi 1$ and $\phi 2$. At the end of the analog CCD shift register 14 toward which the charges are transferred, there is provided a charge-voltage converter 15 in the form of a floating diffusion amplifier. On receiving the transferred signal charge, the charge-voltage converter 15 converts it to a signal voltage.

As in the 1st linear sensor section 10, the 2nd and 3rd linear sensor sections 20 and 30 respectively include: linear sensor arrays 22 and 32 each composed of a large number of photoelectric conversion elements 22 or 32 arranged in a line; readout gates 23 and 33 for reading signal charges from the linear sensor arrays 22 and 32; analog CCD shift registers 24 and 34 for transferring the signal charges; and charge-voltage converters 25 and 35 for converting the signal charges into signal voltages. The 1st, 2nd, and 3rd linear sensor sections 10, 20, 30 are arranged for example at equal intervals in such a manner that the center-to-center distance between adjacent ones of the linear sensor arrays 12, 22, 32 corresponds to seven lines.

The width d of each sensor array 12, 22, 23 is equal to the line width, which will be used hereinafter as the unit of the distance between different linear sensor arrays. As can be understood from FIG. 1, since each of the 1st, 2nd and 3rd linear sensor sections 10, 20, and 30 has its own readout gate 12, 23, or 33 and analog CCD shift register 14, 24, or 34 disposed at the side of the corresponding linear sensor arrays 12, 22, or 32, it is impossible to dispose the linear sensor arrays themselves at immediately adjacent locations with no spacing. Thus, the center-to-center distance between adjacent ones of the linear sensor arrays 12, 22, 32 is selected to a value equal to or greater than two lines.

In this embodiment, as described above, the linear sensor is constructed in the three-line structure composed of the 1st, 2nd, and 3rd linear sensor sections 10, 20, and 30. With this structure, it is possible to read three lines of image information at the same time while scanning an image in the secondary scanning direction perpendicular to the linear sensor arrays. Since the 1st, 2nd, and 3rd linear sensor sections 10, 20, and 30 are spaced apart from each other in the secondary scanning direction, the output signals OUT1, OUT2, and OUT3 of the 1st, 2nd, and 3rd linear sensor sections 10, 20, and 30 represent the image information at the locations apart from one another in the secondary scanning direction.

In the present embodiment, the 1st, second, and 3rd linear sensor sections 10, 20, and 30 are spaced, for example, seven lines apart from each other and these linear sensor sections 10, 20, and 30 are moved three lines in the secondary direction at a time in a stepping fashion. Thus, the linear sensor constructed in the three-line structure composed of linear sensor sections 10, 20, and 30 are moved three lines in the secondary direction at a time in a stepping fashion, which allows an image to be scanned at a scanning speed as high as three times that of the conventional line sensor. Furthermore, as described above, the linear sensor sections 10, 20, and 30 can sense image information along different lines without duplication.

Figure 2:
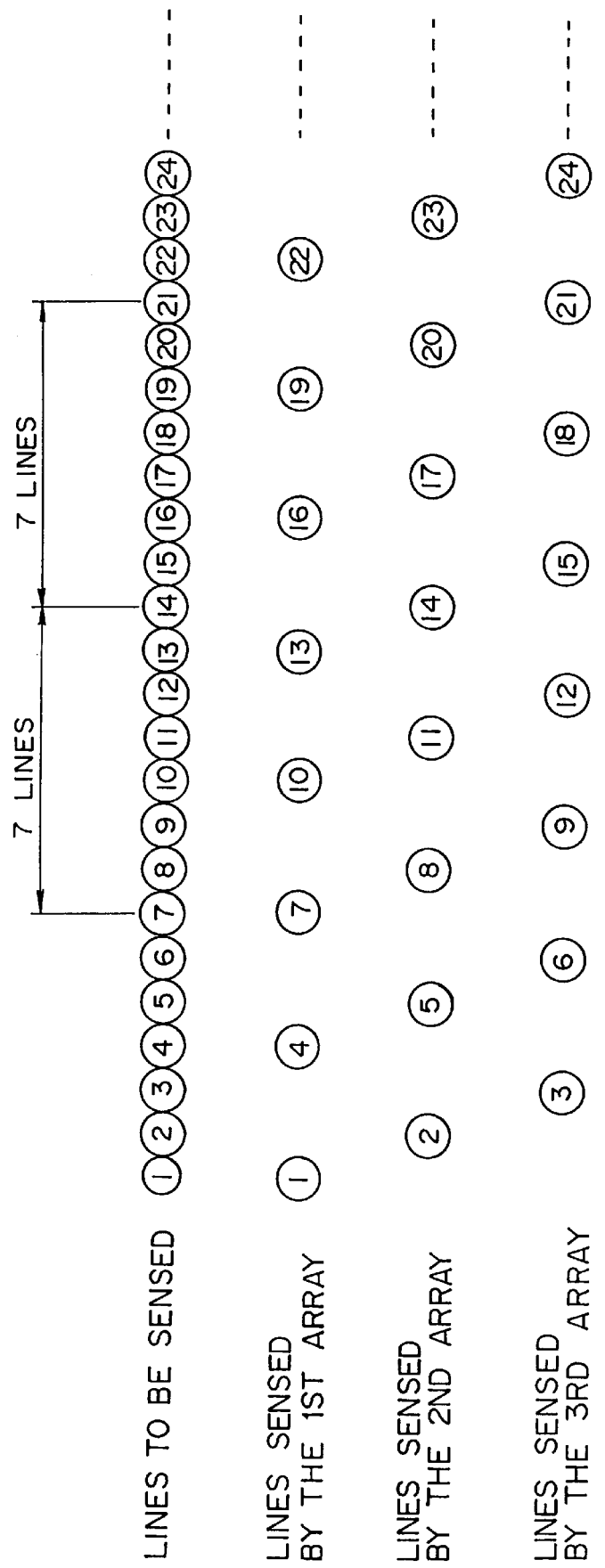
FIG. 2 is a schematic representation of the manner in which lines are scanned by the respective linear sensor arrays.

FIG. 2 illustrates the manner in which lines to be read are scanned by the respective linear sensor sections 10, 20, and 30. Since the linear sensor sections 10, 20, and 30 are spaced 7 lines apart from each other, when for example the 21st line is scanned by the 3rd linear sensor section 30 located at the rearmost position in the secondary scanning direction, the 14th line is scanned by the 2nd linear sensor section 20 at the location 7 lines advanced relative to the 3rd linear sensor section 30, and the 7th line is scanned by the 1st linear sensor section 10 at the location 7 lines further advanced.

Thus, the output signals OUT1, OUT2, and OUT3 which are output at the same time from the respective linear sensor sections 10, 20, and 30 represent image information at different spatial locations, that is, at the 7th, 14th, and 21st lines. The image information represented by these output signals OUT1, OUT2, and OUT3 which are output at the same time from the linear sensor sections 10, 20, and 30 is not concerned with immediately adjacent lines but distant lines, and thus these output signals OUT1, OUT2, and OUT3 cannot be processed at the same time. Therefore, it is required to adjust the timing of processing these output signals OUT1, OUT2, and OUT3 provided by the linear sensor sections 10, 20, and 30.

Figure 3:
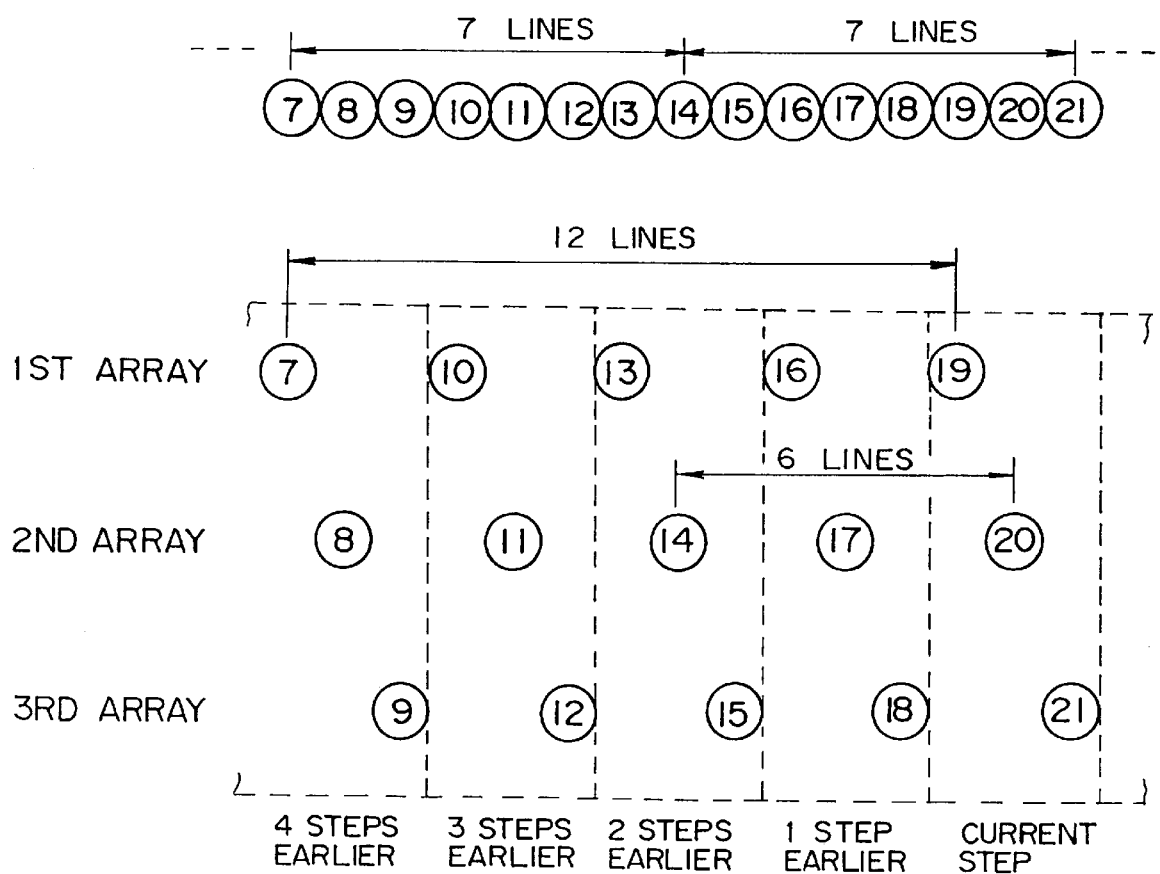
FIG. 3 is a schematic representation of a timing adjustment operation.

The adjustment of the timing in terms of the output signals OUT1, OUT2, and OUT3 provided by the linear sensor sections 10, 20, and 30 is performed as follows. The adjustment of the timing in terms of the output signals OUT1, OUT2, and OUT3 provided by the linear sensor sections 10, 20, and 30 should be performed with respect to the output signal OUT3 provided by the 3rd linear sensor section 30 located at the rearmost position in the secondary scanning direction. In a specific example shown in FIG. 3, when the 21st line is sensed by the linear sensor section 30, the signal output by this linear sensor section 30 should be processed together with the signals associated with the 19th and 20th lines.

The 19th line is sensed by the 1st linear sensor section 10 at the location 14 lines apart from the 3rd linear sensor section 30. Since the linear sensor sections 10, 20, and 30 are moved in the secondary direction by a distance corresponding to 3 lines at a time, the 19th line has been sensed 4 (=(19−7)/3) steps earlier than the sensing of the 21st line by the linear sensor section 30. Therefore, in the case of the three-line stepping, the timing of the output signal OUT1 of the linear sensor section 10 relative to the output signal OUT3 of the 3rd linear sensor can be adjusted by delaying the output signal OUT1 by a time period corresponding to 4 lines.

On the other hand, the 20th line is sensed by the 2nd linear sensor section 20 at the location 7 lines apart from the 3rd linear sensor section 30. The 20th line has been sensed 2 (=(20−14)/3) steps earlier than the sensing of the 21st line by the linear sensor section 30. Therefore, the timing of the output signal OUT2 of the linear sensor section 20 relative to the output signal OUT3 of the 3rd linear sensor can be adjusted by delaying the output signal OUT2 by a time period corresponding to 2 lines.

In the present embodiment, the above timing adjustment is accomplished by a timing adjustment circuit 40 connected to the outputs of the linear sensor sections 10, 20, and 30, as shown in FIG. 1. The timing adjustment circuit 40 delays the output signal OUT1 of the linear sensor section 10 by a time period corresponding to 4 lines and outputs the resultant signal as an output signal OUT1'. Similarly, the timing adjustment circuit 40 delays the output signal OUT2 of the linear sensor section 20 by a time period corresponding to 2 lines and outputs the resultant signal as an output signal OUT2'. On the other hand, the output signal OUT3 of the linear sensor section 30 is directly output as an output signal OUT3' with no delay.

In this way, three lines of timing-adjusted output signals are obtained. That is, the three lines of output signals OUT1', OUT2', and OUT3' obtained in the above-described manner are immediately adjacent to each other. Thus, when the 3rd linear sensor section 30 is sensing for example the 21st line, the 1st and 2nd linear sensors 20 and 30 are sensing the 7th and 14th lines, while the timing adjustment circuit 40 outputs three output signals OUT1', OUT2', and OUT3' associated with the image information of the 19th, 20th, and 21st lines.

In the present embodiment, as described above, the linear sensor has, for example, a three-line structure composed of three linear sensor sections 10, 20, and 30 which are equally spaced, for example, seven lines apart from each other. These three linear sensor sections 10, 20, and 30 are moved three lines in the secondary direction at a time. The output signals OUT1, OUT2, and OUT3 of the respective linear sensor sections 10, 20, and 30 are adjusted in timing by the timing adjustment circuit so that three adjacent lines of image information are provided by the above three linear sensor sections 10, 20, and 30. This allows the linear sensor to read image information at a high speed three times that of the conventional sensor.

Although in the above specific example three linear sensor arrays are employed so that image information can be scanned at a three times higher speed than the conventional sensor, the present invention is not limited to that. Two linear sensor arrays, or otherwise four or more linear sensor arrays may be employed so that the scanning can be performed at a speed increased by a factor equal to the number of linear sensor arrays. In this case, it is required that the sensor arrays be spaced by a distance which allows these sensor arrays to read image information without duplication.

Figure 4:
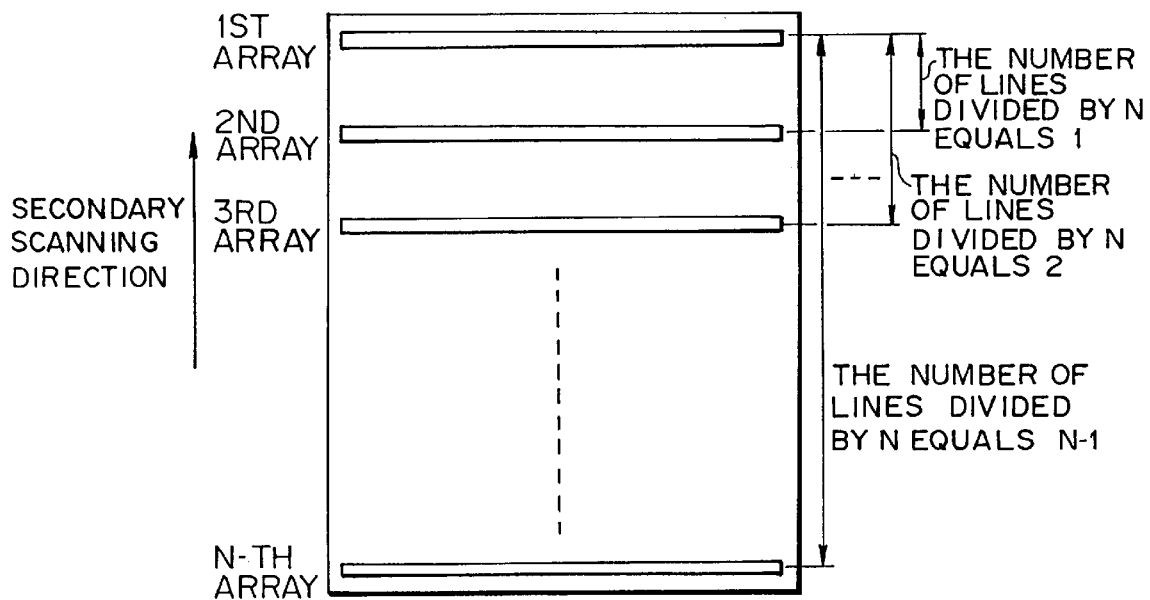
FIG. 4 is a schematic diagram illustrating the condition in terms of the arrangement of linear sensor arrays.

The above requirement of avoiding duplication can be met as follows. When there are N sensor arrays as shown in FIG. 4, the 2nd and following sensor arrays are located at positions apart from the 1st sensor array by distances, represented in units of lines, which yield remainders of 1, 2, . . . , N−1 when divided by N. In this arrangement, if the sensor arrays are moved by a distance corresponding to N lines at a time in the secondary scanning direction, then image information can be read without duplication among different sensor arrays.

In the above specific example having the three-line structure shown in FIG. 1, the distances of the 2nd and 3rd sensor arrays 22 and 23 relative to the 1st sensor array are 7 and 14 lines, respectively. If the distance of 7 lines for the 2nd sensor array 22 is divided by the number of sensor array N=3, then the resultant remainder is 1. Similarly, the distance of 14 lines for the 3rd sensor array 32 is divided by the number of sensor array N=3, then the resultant remainder is 2. Thus, the arrangement shown in FIG. 1 satisfies the above-described requirement in terms of the spacing among the sensor arrays.

Figure 5:
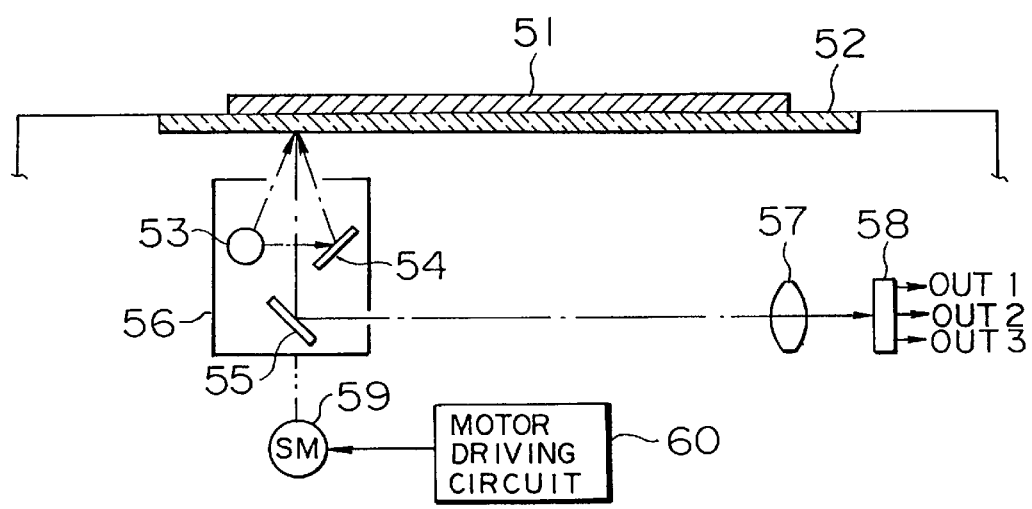
FIG. 5 is a schematic diagram of an embodiment of an image sensing device according to the present invention.

The above-described linear sensor according to the present invention may be employed for example as an image sensing device in a digital copying machine. FIG. 5 illustrates an example of the construction of an image sensing device. As shown in FIG. 5, a document 51 whose image information is to be sensed is placed on a platen of glass 52 in such a manner that the page to be sensed is in contact with the platen of glass 52. The image information of the document is sensed via a movable optical system 56 which is adapted to move in the secondary scanning direction (in the direction left to right or right to left in FIG. 5) and which includes for example an exposure lamp 53, a reflector 54, and a reflecting mirror 55. After reflected by the reflecting mirror 55 of the movable optical system 56, the light is focused by a focusing lens 57 so that an image is formed on the light receiving plane of the linear sensor 58.

The motor driving circuit 60 drives the movable optical system 56 via a driving source such as a stepping motor 59 such that the movable optical system 56 is moved at a constant speed in the secondary scanning direction thereby sensing the image information of the document 51. In the case where the linear sensor composed of three sensor arrays according to the above embodiment, the motor driving circuit 60 drives the stepping motor 59 repeatedly such that the movable optical system 56 is moved three lines at a time in the secondary scanning direction thereby ensuring that the image information is read by the sensor arrays without duplication. Also in the case where the linear sensor 58 includes two sensor arrays or four or more sensor arrays, the movable optical system 56 may be driven in a similar manner.

In the above embodiment, when the number of sensor arrays is given as N, the 2nd and following sensor arrays are located at positions apart from the 1st sensor array by distances, represented in units of lines, which yield remainders of 1, 2, . . . , N−1 when divided by N, and the sensor arrays are moved by a distance corresponding to N lines at a time in the secondary scanning direction so that image information can be read without duplication among different sensor arrays. However, the distance among the sensor arrays is not limited to that. The sensor arrays may be located in any other ways as long as no duplication occurs among the image information sensed by different sensor arrays.

Figure 6:
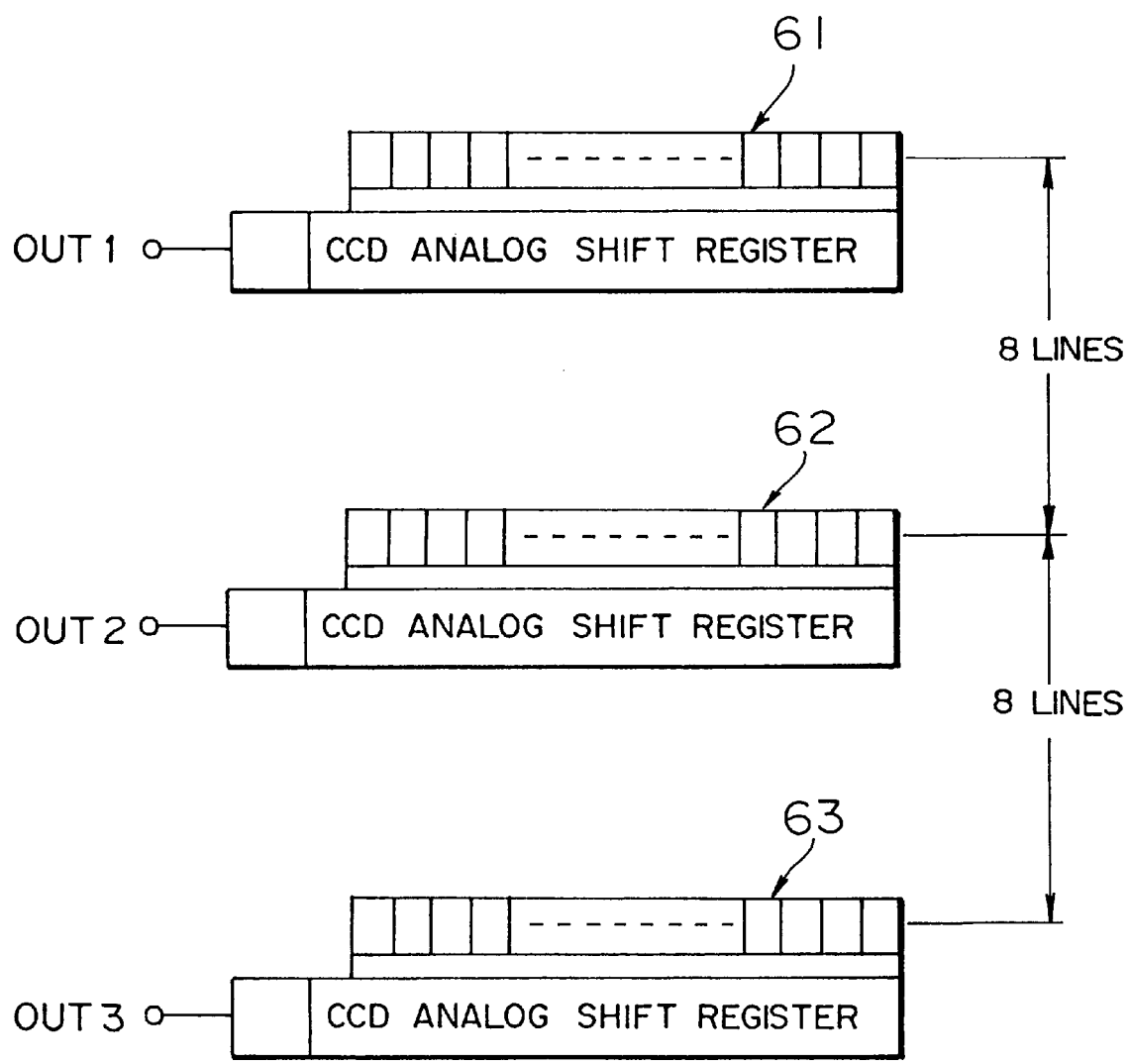
FIG. 6 is a schematic diagram illustrating another scanning method.

For example, as shown in FIG. 6, a linear sensor having a three-line structure may be constructed in such a manner that 1st, 2nd, and 3rd linear sensor arrays 61, 62, and 63 are located at positions eight lines apart from each other. In this case, image information is first sensed by the respective linear sensor arrays 61, 62, and 63 while moving these linear sensors at a constant speed in the secondary scanning direction over a distance corresponding to eight lines. The linear sensor is then driven at a high speed by a distance corresponding to sixteen lines so that the sixteen lines which have already been read by the 2nd and 3rd linear sensor arrays 62 and 63 are skipped. After that, the linear sensor is moved again at the constant speed so that another eight lines of image information are sensed by each linear sensor array 61, 62, and 63 and thus twenty four lines of image information are read in total. In this way, the constant-speed scanning and the high-speed skipping operations are alternately repeated.

In this technique, three linear sensor arrays 61, 62, and 63 may be equally spaced by an arbitrary distance apart from each other and three lines of image information can be sensed at the same time via the three linear sensor arrays without duplication among these linear sensor arrays. This allows a great increase in the scanning speed compared to the conventional technique.

To apply the above-described scanning method to the image sensing device shown in FIG. 5, it is required that the motor driving circuit 60 drive, by means of sequence control, the stepping motor 59 alternately in the constant-speed scanning mode and the high-speed skipping mode. However, such the requirement of the sequence control imposes an additional designing task on a user when applying the linear sensor of the present invention to for example an image sensing device. In this respect, it is more desirable to construct a linear sensor in the form employed in the 1st embodiment described above in that the scanning may be performed simply at a constant speed, although there is a limitation in terms of the spacing of the linear sensor arrays 10, 20, and 30.

Figure 7:
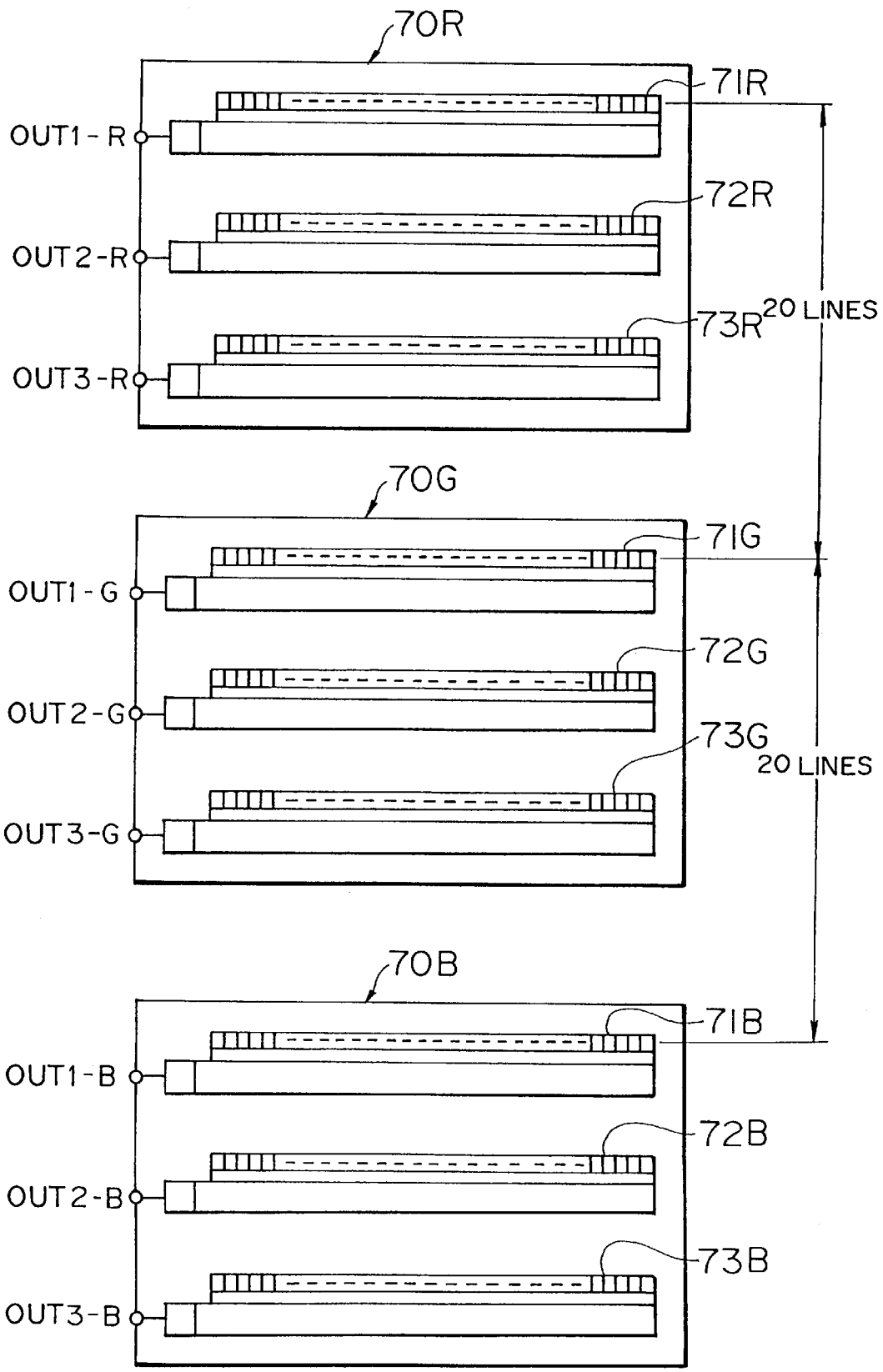
FIG. 7 is a schematic diagram of a color linear sensor.

In the specific embodiments described above, although the invention is applied to monochrome linear sensors, the invention is also applicable to color linear sensors. For example, three sets of three-line linear sensors shown in FIG. 1 are disposed so that the respective linear sensors deal with R, G, and B colors as shown in FIG. 7. These three sets of linear sensors are located such that the 1st linear sensor arrays of the respective sets of linear sensors 70R, 70G, and 70B are spaced for example 20 lines apart from each other.

A red (R) filter is disposed on the light receiving plane of each linear sensor array 71R, 72R, and 73R of the red (R) linear sensor 70R. Similarly, a green (G) filter is disposed on the light receiving plane of the linear sensor arrays 71G, 72G, and 73G of the green (G) linear sensor 70G, and a blue (B) filter is disposed on the light receiving plane of the linear sensor arrays 71B, 72B, and 73B of the blue (B) linear sensor 70B.

In this color linear sensor, not only the timing of the output signals provided by the three linear sensor arrays is adjusted in the manner described above for each set of the linear sensor responsible for each color, but also the timing of the output signals is adjusted among the three sets of linear sensors for different colors which are 20 lines apart from each other.

In the present invention, as described above, the linear sensor includes a plurality of linear arrays of sensor elements located at predetermined intervals wherein image information is sensed while scanning an image in the secondary scanning direction. Thus, a plurality of lines of image information can be sensed at a time, which makes it possible to reduce the sensing time period by a factor equal to the number of linear sensor arrays.

Furthermore, in the present invention, N linear arrays of sensor elements are disposed in such a manner that the 2nd and following linear arrays of sensor elements are located at positions apart from the 1st linear array by distances, represented in units of line widths, which yield remainders of 1, 2, . . . , N–1 when divided by N, and, in the sensing operation, the linear sensor is moved by a distance corresponding to N lines at a time in the secondary scanning direction. With this arrangement, it is possible to sense image information on all lines while scanning an image in the secondary scanning direction at a scanning speed N times that achievable with a single linear sensor array. In this sensing operation, no duplication occurs among different linear sensor arrays.

What is claimed is:

1. An image sensing device comprising:
    a linear sensor including a plurality of linear arrays of sensor elements, said plurality of linear arrays being arranged in parallel to each other at locations a predetermined distance apart from each other; and
    driving means for driving said linear sensor in a secondary scanning direction such that said plurality of linear arrays of sensor elements simultaneously sense image information on different lines of an object, wherein each of said lines are sensed by only one of said linear arrays.

2. An image sensing device according to claim 1, wherein said linear sensor includes N linear arrays of sensor elements (wherein N is an integer equal to or greater than 2), the 2nd linear array of sensor elements and those following the 2nd linear array being located at positions apart from the 1st linear array by such distances, represented in units of line widths, which satisfy the condition that the division of the distances by N yields remainders of 1, 2, . . . , N–1.

3. An image sensing device according to claim 2, wherein said driving means drives in a stepping fashion said linear sensor in the secondary scanning direction by a distance corresponding to N lines at a time.

4. A linear sensor comprising N linear arrays of sensor elements (wherein N is an integer equal to or greater than 2), wherein the 2nd linear array of sensor elements and those following the 2nd linear array are located at positions apart from the 1st linear array by such distances, represented in units of line widths, which satisfy the condition that the division of the distances by N yields remainders of 1, 2, . . . , N–1.

5. A linear sensor according to claim 4, further comprising a timing adjustment circuit for delaying by proper time periods the signals output by the respective linear arrays of sensor elements so that image information on successive N lines is output at the same time.

6. A method of driving a linear sensor, said linear sensor comprising N linear arrays of sensor elements (wherein N is an integer equal to or greater than 2), the 2nd linear array of sensor elements and those following the 2nd linear array being located at positions apart from the 1st linear array by such distances, represented in units of line widths, which satisfy the condition that the division of the distances by N yields remainders of 1, 2, . . . , N–1,
    said method includes the step of driving, in a stepping fashion, said linear sensor in the secondary scanning direction perpendicular to said linear arrays of sensor elements by a distance corresponding to N lines at a time after each step of generating image information with the linear arrays.

7. A method of driving an image sensing device, said image sensing device including a linear sensor composed of a plurality of linear arrays of sensor elements, said plurality of linear arrays being arranged in parallel to each other at locations a predetermined distance apart from each other,
    said method including the step of driving said linear sensor in a secondary scanning direction such that said plurality of linear arrays of sensor elements simultaneously sense image information on different lines of an object, wherein each of said lines are sensed by only one of said linear arrays.

8. A method of driving an image sensing device, according to claim 7, wherein in said driving step, said linear sensor is driven in the secondary scanning direction perpendicular to said linear arrays of sensor elements.

9. A method of driving an image sensing device, according to claim 7, further including the step of adjusting a timing of signals output by said linear arrays of sensor elements.

* * * * *